United States Patent [19]

Lo et al.

[11] Patent Number: 5,281,486
[45] Date of Patent: Jan. 25, 1994

[54] ROOFING MATERIAL CONTAINING NON-LEACHABLE FIRE RETARDANT COMPRISING AN ALKALINE CONDENSATION PRODUCT OF A FUSIBLE PHENOLIC RESIN AND A DIALKYL-N,N-BIS(HYDROXYALKYL) AMINOALKYL PHOSPHONATE

[75] Inventors: Chun Y. Lo, Bartlett; Lehtinen Thomas A., St. Charles, both of Ill.

[73] Assignee: Masonite Corporation, Chicago, Ill.

[21] Appl. No.: 935,976

[22] Filed: Aug. 27, 1992

Related U.S. Application Data

[62] Division of Ser. No. 248,691, Sep. 23, 1988, Pat. No. 5,143,989.

[51] Int. Cl.$^5$ ............................................. B32B 21/08
[52] U.S. Cl. .................................... 428/528; 524/430; 428/529; 428/921
[58] Field of Search ............ 524/430, 528, 529, 537.1, 524/537.5; 428/921

[56] References Cited

U.S. PATENT DOCUMENTS

| | | |
|---|---|---|
| 3,132,169 | 5/1964 | Birum et al. . |
| 3,192,242 | 6/1965 | Birum . |
| 3,297,796 | 1/1967 | Smith ................................ 558/158 |
| 3,306,937 | 2/1967 | Clampitt et al. . |
| 3,309,342 | 3/1967 | Friedman ............................. 528/72 |
| 3,344,112 | 9/1967 | Birum et al. . |
| 4,012,558 | 3/1977 | Wurman .............................. 428/411 |
| 4,086,206 | 4/1978 | Saito .................................. 528/168 |
| 4,364,991 | 12/1982 | Byrd ................................... 428/265 |
| 4,459,339 | 7/1984 | Libit .................................. 428/514 |

OTHER PUBLICATIONS

Stauffer Chemical Company—"Flame Retardant Chemicals" Product Data and Product Safety Information sheets regarding FYROL® 6 (Nov. 1980).

*Primary Examiner*—Christopher Henderson
*Attorney, Agent, or Firm*—Marshall, O'Toole, Gerstein, Murray & Borun

[57] ABSTRACT

A fusible phenolic resin and a dialkyl-N, N-bis (hydroxyalkyl) aminoalkyl phosphonate are condensed to form a water-insoluble resin having fire retardant properties. Fire resistant materials are made by causing the condensation to occur in situ when a normally flammable material and the reactants are mixed and the mixture is heated at 250° F. to 480° F. Wooden articles such as molded hardboard roofing shingles of this invention do not lose their fire resistance after being soaked with rain repeatedly.

11 Claims, No Drawings

5,281,486

ROOFING MATERIAL CONTAINING NON-LEACHABLE FIRE RETARDANT COMPRISING AN ALKALINE CONDENSATION PRODUCT OF A FUSIBLE PHENOLIC RESIN AND A DIALKYL-N,N-BIS(HYDROXYALKYL) AMINOALKYL PHOSPHONATE

CROSS-REFERENCE TO RELATED APPLICATION

This is a division of copending, commonly assigned application Ser. No. 07/248,691 filed Sep. 23, 1988, now U.S. Pat. No. 5,143,989 issued Sep. 1, 1992.

FIELD OF THE INVENTION

This invention relates to fire resistant materials. More particularly, it relates to materials in which the fire retardant agent is a water-insoluble resin. Still more particularly, it is directed to molded hardboard roofing shingles impregnated with a phosphorus-containing phenolic resin.

BACKGROUND OF THE INVENTION

Wood shake shingles, although popular in many parts of the United States, have been prohibited in some areas because of their vulnerability to a rapid spread of fire when sparks from a burning building are blown onto the roofs of neighboring buildings. Various solutions to the problem have been proposed. In U.S. Pat. No. 4,012,558, Wurman teaches a flame resistant board of bonded wood particles wherein a mixture of ammonium bromide, urea phosphate, and hexamethylenetetramine is incorporated in the bonding agent. Urea-formaldehyde resins are preferred over the phenol-and melamine-formaldehyde resins as the bonding agent. The swelling of the wood in water and the reduction of its bending strength, which Wurman identifies as problems associated with the use of ammonium bromide and other inorganic salts, are not fully overcome by the boards exemplifying Wurman's invention.

Libit, in U.S. Pat. No. 4,459,339, teaches the impregnation of wood shake shingles with a mixture of an acrylic monomer and a flame retardant phosphate such as bis-(2, 3-dibromopropyl) phosphate. Polymerization of the monomer forms a resinous binder in which the phosphate is physically bound.

The incorporation of organophosphorous compounds in urea-formaldehyde resins, epoxy resins, acrylics, polyesters and the like is taught in U.S. Pat. Nos. 3,132,169; 3,192,242; 3,306,937; and 3,344,112 for flameproofing hardboard and other cellulosic materials.

Stauffer Chemical Company sells diethyl-N,N-bis (2-hydroxyethyl) aminomethyl phosphonate as a flame retardant agent under its Fyrol trademark. The phosphonate is designed to react as a polyol in the formation of polyurethane resins. The polyol function also takes part in the reaction when the phosphonate is introduced into the reaction mixture of melamine and formaldehyde so that the condensation product contains chemically bound phosphorus. Stauffer teaches in it product literature, however, that this phosphonate decomposes upon heating, forming acids at temperatures above 125° C. (257° F.). It decomposes slowly under moist alkaline conditions even at ambient temperatures according to that literature.

SUMMARY OF THE INVENTION

It is surprising, therefore, that this phosphonate, hereinafter referred to as Fyrol 6, can survive the high temperatures and alkaline conditions of a phenol-formaldehyde condensation to take part in the reaction as a polyol so that the resin produced contains chemically bound phosphorus which does not leach out when soaked in water indefinitely.

It is an object of this invention to provide a flame resistant phenolic resin comprising a phosphonate which is chemically bound therein.

It is another object to provide a roofing material impregnated with such a flame retardant resin which will retain its resistance to fire upon repeated and prolonged contact with water.

It is another object to provide wood shake shingles which remain fire resistant throughout many years of exposure to rain.

These and other objects of this invention which will become apparent from the following detailed description thereof are achieved by impregnating a material with an alkaline mixture of a methylol phenol and a dialkyl-N, N-bis (hydroxyalkyl) aminoalkyl phosphonate, and heating the impregnated material at an elevated temperature for a time sufficient to form a water-insoluble resin.

DETAILED DESCRIPTION OF THE INVENTION

The material which may be permanently fireproofed according to this invention is characterized chiefly by its ability to absorb the reaction mixture which generally but not necessarily is aqueous. Primarily, this invention is directed to the flameproofing of wood, paper and normally flammable fabrics, whether cellulosic or not. Fabrics made of cotton, rayon, nylon, and polyesters are examples of one type of material contemplated in this invention. Insulation board and hardboards made by compressing wood fibers or other lignocellulosic fibers, particleboard, plywood, natural wood, and cardboard are examples of the other types of material of primary interest. For materials such as asphalt which are substantially impervious to water, a surfactant or other emulsifier which does not interfere with the condensation reaction may be added to the reaction mixture. Another option is to form the insoluble, infusible condensation product separately and pulverize it so that it may be blended into the asphalt prior to the fabrication of roofing materials or other building materials therefrom.

The methylol phenols, or phenol alcohols, are products of the condensation of a phenol and formaldehyde in alkaline solution. Commonly known as resoles, the methylol phenols have from one to three methylol groups on the phenol ring and are the predominant products in the A-stage resin. Upon continued heating, these enter into a series of complex reactions which change the water-soluble A-stage resin into a slightly cross-linked, water-insoluble but still fusible B-stage resin and finally into the completely insoluble and infusible C-stage resin. These stages are not clearly defined, as to the degree of condensation but there is still a sufficient proportion of reactive methylol groups in the B-stage resin to accomodate the incorporation of the phosphonate during the final stages of the condensation. The term fusible phenolic resin is used herein to include the A-stage resin, the B-stage resin and mixtures thereof. It is also intended to include such resins made from alkyl phenols such as t-amylphenol, t-butylphenol, the cresols and other substituted phenols, as well as from other aldehydes such as furfural. The resin is used as the binder in much of the insulation board and hardboard industry and in substantially all of the particleboard and plywood industry where it is cured in place during the manufacturing process.

In this invention, the phenolic resin is modified by the introduction of the phosphonate moiety contributed by the dialkyl-N, N-bis (hyroxyalkyl) aminoalkyl phosphonate. When the Fyrol 6 flame retardant is part of the condensation reaction mixture, the alkyl groups in the phosphonate are not all the same but they may be the same as in, for example, diethyl-N, N-bis (2-hydroxyethyl) aminoethyl phosphonate. Generally, any alkyl group is suitable but for practical purposes it is preferred that the alkyl groups are selected from those having four carbon atoms or less. Other examples of the phosphonates contemplated for this invention include dimethyl-N, N-bis (2-hydroxyethyl) aminomethyl phosphonate; dipropyl-N, N-bis (3-hydroxypropyl) aminoethyl phosphonate; dioctyl-N, N-bis (2-hydroxethyl) aminoethyl phosphonate; and dimethyl-N, N-bis (4-hydroxybutyl) aminomethyl phosphonate.

The pH of the alkaline condensation reaction mixture is from about 9 to about 11. Sodium hydroxide, potassium hydroxide, sodium carbonate or ammonium hydroxide are suitable bases for generating the desired pH.

Generally, flame resistance is imparted to the material even when the weight ratio of the fusible phenolic resin to phosphonate is as high as about 16:1. Higher amounts of the phosphonate, such as represented by a 1:1 weight ratio of the two reactants, will, of course, tend to increase the flame resistance. To minimize the loss of possible unreacted phosphonate by subsequent leaching when the material is in contact with water, however, it is preferred that the ratio be about 2:1 or higher. To maximize the flame resistance, it is preferred to use no more than about 4 parts by weight of the fusible phenolic resin to each part of the phosphonate. The amounts of fusible phenolic resin and phosphonate, based on the weight of the material to be treated, are from about 3% to about 16% and from about 1% to about 10%, respectively.

It is preferred to make the fusible phenolic resin separately and then add the phosphonate to the aqueous resin solution. The viscosity of the aqueous resin solution may be from about 10 centipoises to about 1000 centipoises when measured at a pH of about 10.3. Because of the insolubility and infusibility of the final resin, it is expedient to intermix the normally flammable material and the reaction mixture so that the resin will be formed in place when it is heated at a temperature of from about 250° F. to about 480° F. A mass of wood fibers, for example, may be blended with the reaction mixture and consolidated under heat and pressure to form low, medium, or high density fiberboard. On the other hand, an already formed mat of wood fibers may be impregnated with the reaction mixture before further consolidation to a hardboard. In this embodiment of the invention, one or both of the major surfaces of the mat may be impregnated. The full thickness of the mat may be impregnated or penetration of the two surface regions may be such as to leave a core of untreated material. An otherwise finished hardboard may be flameproofed by coating it with the reaction mixture and heating it to a temperature of from about 250° F. to about 480° F. (about 120° C. to about 250° C.). Heating of the coated hardboard in a press at from about 400 psi to about 1200 psi helps to force the reactants into the core of the board.

The reaction time will, of course, vary in accordance with the temperature but the leach resistance of the product suffers when the temperature is held at about 350° F. or higher for a prolonged time. For example, a hardboard post-treated with the condensation reaction mixture showed no loss of phosphorus by leaching when heated at 350° F. for 15 minutes but one heated at the same temperature for 30 minutes lost 11% of the phosphorus when subjected to the same 3 day leaching test.

On the other hand, a post-treated hardboard heated at 300° F. for 15 minutes lost about 37% of its phosphorus content whereas one heated at that temperature for 60 minutes lost only 5%. Consolidation of a treated dry mat in a hardboard press at from about 400° F. to about 480° F. for from about 2 minutes to about 3 minutes gives a flame resistant hardboard of this invention.

Additional fire retardancy may be achieved by adding from about 1% to about 50% by weight of alumina trihydrate, also known as aluminum hydroxide, to the material. In a first situation, the phosphorus-containing phenolic resin inhibits glowing of the material and promotes the formation of char while the alumina trihydrate (ATH) delays surface ignition and reduces the flame spread. Good results are obtained when as little as 1% of ATH, based on the board weight, is concentrated in each surface region of a fiberboard. It has also been found that the distribution of from about 10% to about 35% by weight of ATH throughout the board in combination with the phosphorus-containing phenolic resin gives a highly flame resistant board having good strength.

The following examples illustrate various aspects of the invention. All parts are by weight unless otherwise noted.

EXAMPLE 1

An aqueous solution of a phenol-formaldehyde condensation product containing sodium hydroxide as the condensation catalyst was mixed with Fyrol 6 phosphonate at a 3:1 weight ratio and the mixture was applied to both major surfaces of a wet-felted dry mat of wood fibers. The solids uptake in each of the surface regions was 5% by weight. The mat was then dried and consolidated to a hardboard at 465° F. (235° C.) and 900 psi for 2 minutes. The core temperature of the board was 400°–420° F. (204°–216° C.). The hardboard passed the "Class C" burning brand test of the ASTM E108-83 test method.

EXAMPLE 2

Each of four dry, wet-felted wood fiber mats was treated with a different mixture of the phenol-formaldehyde condensation product of Example 1 and Fyrol 6 phosphonate and dried. The solids uptake in each of the surface regions was 6% by weight. Each mat was made into a hardboard as in Example 1. The weight ratios of the phenol-formaldehyde product and phosphonate in each mixture and the weight loss of the hardboard after being soaked in cold water for 72 hours and dried is given in Table I.

TABLE I

| Hardboard | Weight Ratio | Weight loss (%) |
| --- | --- | --- |
| A | 1:1 | 1.8 |
| B | 2:1 | 1.3 |
| C | 3:1 | 1.2 |
| D | 4:1 | 1.2 |

An analysis of the hardboard C for phosphorus content indicated that 6.5% of the original weight of phosphorus was leached out of the board by the water.

EXAMPLE 3

A dry mat of wet-felted wood fibers was treated by roller coating the top face with a 2:1 by weight mixture of the phenol-formaldehyde resin and Fyrol 6 phsophonate to achieve a 9.5% solids uptake and roller coating the opposite face with a 3:1 by weight mixture of the two reactants to achieve a 6.5% solids uptake. A second mat of the same material was treated with an aqueous solution of the Fyrol 6 phosphonate by roller coating the top face to achieve a 3.2% solids uptake and the bottom face to achieve 1.6% solids uptake. Both mats were dried and pressed to a hardboard under conditions similar to those of Example 1. Upon being subjected to the flying brand test (ASTM E108-83), the first board was far superior to the second board because of a lower level of flaming and a longer burn-through time.

EXAMPLE 4

Dry wood fiber was sprayed with a 3:1 by weight mixture of the phenol-formaldehyde resin and Fyrol 6 phosphonate to achieve a solids uptake of 5% by weight. The fibers were formed into a mat and then the top surface of the mat was sprayed with the mixture to achieve another 2% solids uptake based on the dry weight of untreated mat. The mat was molded at 465° F. and 500 psi to produce a roofing shingle which passed a scaled down ASTM E108-83 burning brand test.

EXAMPLES 5-10

Two sets of mats containing alumina trihydrate (ATH) were made by mixing the ATH in a slurry of wood fibers at about 3% consistency, dewatering the slurry on a screen, and drying the mat at 275° F. for two hours. The mats in one set contained 10% ATH by weight and those in the other contained 15% ATH. Each mat was impregnated with a fusible phenol-formaldehyde resin/Fyrol 6 (3:1)w solution by drawing the solution into the top surface region by vacuum, drying the mat, drawing a different solution of the resin/phosphonate into the bottom surface region and drying the mat again. The concentration of the solutions and the percent by weight of solids taken up by each surface are given in the following table. Each of the thus treated mats and an untreated mat were pressed into hardboard at 465° F. and 900 psi. Each board was tested for fire resistance by the flying brand test and for physical and mechanical properties. The results are given in Table II.

TABLE II

| Example No. | 5 | 6 | 7 | 8 | 9 | 10 | Control |
| --- | --- | --- | --- | --- | --- | --- | --- |
| ATH (%) | 10 | 10 | 10 | 15 | 15 | 15 | — |
| PF/Fyrol 6 concentration (%) | | | | | | | |
| Top | 25 | 30 | 35 | 25 | 30 | 35 | — |
| Bottom | 15 | 20 | 25 | 15 | 20 | 25 | — |
| Solids uptake (%) | | | | | | | |
| Top | 6.5 | 8.0 | 9.5 | 6.5 | 8.0 | 9.5 | — |
| Bottom | 3.5 | 5.0 | 6.5 | 3.5 | 5.0 | 6.5 | — |
| Time to ignition (minutes:seconds) | 2:52 | 2:15 | 2:55 | 1:53 | 2:34 | No ignition | 1:15 |
| Flame spread at four feet | 8 inches | 1 foot | 8 inches | 10 inches | 9 inches | — | 2 feet |
| Flying brands | None | None | None | None | None | None | Yes |
| Burn through time (minutes:seconds) | * | 8:29 | * | * | * | * | 7:28 |
| Class C rating | Pass | Fail | Pass | Pass | Pass | Pass | Fail |
| Status at 4 minutes | S.E. | Burning | S.E. | S.E. | S.E. | S.E. | Burning |
| MOR (psi) | 7257 | 8109 | 6993 | 6240 | 7029 | 7595 | 5528 |
| Specific gravity | 1.12 | 1.13 | 1.11 | 1.08 | 1.08 | 1.16 | 1.06 |
| MOE (psi) | 977 | 1120 | 1104 | 849 | 972 | 1044 | 761 |
| Boil swell (%) | 17.7 | 13.0 | 14.8 | 20.6 | 12.8 | 15.2 | 27.3 |
| Caliper swell (%) | 9.5 | 9.2 | 6.5 | 11.8 | 11.2 | 12.8 | 10.9 |
| Water absorption (%) | 21.5 | 22.7 | 15.0 | 14.1 | 28.3 | 31.6 | 22.3 |
| Falling Ball Impact (in) | 8 | 10 | 9 | 8 | 8 | 7 | 7 |

*No burn through
S.E. = Self-extinguishing

EXAMPLE 11-14

A 3:1 by weight mixture of an A-stage phenol-formaldehyde condensation product (Borden's MT-08) and the Fyrol 6 phosphonate was made up into aqueous solutions containing 15%, 22%, and 30% solids by weight. An airless spray gun was used to spray the solutions onto dry mats of wet felted redwood fiber. Immediately after each face was sprayed, the solution was pulled part way into the mat by vacuum and then the opposite face was treated in the same way. The mats were then dried to a moisture content of about 4 percent. The mats were molded at a steam pressure of 550 psig (about 480° F.) using a breathe press cycle of two breathes followed by a 60 second hold. Each of the resulting 4'×5' sheets of roofing material were cut into individual shingles which were assembled into test decks over 0.5 inch plywood and a 30 pound asphalt felt. A burning brand evaluation of the fire resistance of the shingles was done at equilibrium moisture conditions by a scaled down ASTM E108-83 procedure. Twenty-five brands were used.

The solution concentrations, percent solids uptake by each face, the mat penetration by the solution (expressed as percent of thickness), and the test results for the treated shingles and for red cedar shingles (as a control) are given in Table III.

TABLE III

| Example No. | 11 | 12 | 13 | 14 | Control |
|---|---|---|---|---|---|
| Solution concentration | 15 | 15 | 22 | 30 | — |
| Solids uptake | 3 | 4.5 | 6 | 8 | — |
| Penetration % | 40 | 35 | 30 | 30 | — |
| Pass/Fail Number | 17/8 | 21/4 | 25/0 | 25/0 | 4/21 |
| Average failure time (minutes:seconds) | 4:05 | 3:41 | — | — | 6:46 |
| After flame | 5 | 3 | 0 | 0 | 12 |
| Brand glow | 5 | 0 | 0 | 0 | 13 |
| Flying brands | None | None | None | None | None |
| Class "C" | No | Yes | Yes | Yes | No |

Shingles having the 9, 12, and 16% total solids uptake were tested on rain test decks by the modified E108-83 procedure. After twelve weeks of rain and dry cycles, elemental analyses of the shingles for phosphorus showed that the average retention of phosphorous was essentially 100% for each treatment level.

EXAMPLE 15

Wood fibers containing 3 percent of a fusible phenolic resin and 2 percent of petrolatum were blended with an amount of powdered alumina trihydrate equal to 20% of the fiber weight. A mat formed from the blend was pressed at 465° F. and 900 psi to produce a flat hardboard having a basic weight of 1 lb./cu. ft. The hardboard was dipped while still hot from the press into an aqueous solution of a fusible phenolic resin and the Fyrol 6 phosphonate for one minute and then dried and cured at 300° F. for 45 minutes. The cured board contained 24.6% by weight of the phosphorus-containing resin based on the initial weight of the board. Its specific gravity was 1.13 and its modulus of rupture was 7726 psi.

EXAMPLE 16

The general procedure of Example 15 was followed except that the hot board was dipped for only 1 second and another board was cooled down to room temperature before dipping it into the resin solution for 5 seconds. The resin solids uptake by the hot board was 20.9% by weight while for the cold board it was 8.5%. Ignition of the cold dipped board occurred after having a flame directed at its surface for 3 minutes but the board self-extinguished when the flame was removed. There was no burn through. No ignition of the hot dipped board occurred even after being subjected to the flame for 18 minutes.

Albright & Wilson's Vircol 82 flame retardant is another phosphorus-based polyol which is known to react readily with isocyanates to produce urethane prepolymers. This polyol, which contains 11.3% phosphorus and hydrolyzes slowly in water according to Albright & Wilson, also reacts with a fusible phenolic resin to produce a flame retardant resin from which only a small percentage of the phosphorus was lost by leaching when a molded hardboard roofing shingle containing the resin was soaked in water for 72 hours.

Having thus described particular embodiments of the invention for illustrative purposes, it is not intended thereby to exclude other embodiments, whether specifically mentioned above or implied by the disclosure in general, from the scope of the following claims.

The subject matter claimed is:

1. A flame resistant roofing material comprising a non-leachable flame resistant agent, said flame resistant agent being a resin made by the alkaline condensation of a fusible phenolic resin with a dialkyl-N, N-bis (hydroxyalkyl) aminoalkyl phosphonate at at least about 250° F. wherein the respective alkyl groups of said phosphonate are selected from alkyl groups having one to four carbon atoms.

2. The roofing material of claim 1 wherein the ratio of fusible phenolic resin to phosphonate is from about 1:1 to about 4:1 by weight.

3. The roofing material of claim 2 wherein the ratio is from about 2:1 to about 3:1.

4. The roofing material of claim 1 characterized further in that it is a molded hardboard having the phosphonate-containing resin therein as a binder.

5. The roofing material of claim 1 characterized further in that it is a molded hardboard coated with the phosphonate-containing resin.

6. The roofing material of claim 1 comprising about 1% to about 50%, by weight, alumina trihydrate.

7. The roofing material of claim 1 wherein the phosphonate is diethyl-N, N-bis (hydroxyethyl) aminomethyl phosphonate.

8. The roofing material of claim 1 wherein the phosphonate is selected from the group consisting of dimethyl-N, N-bis (2-hydroxyethyl) aminomethyl phosphonate, dipropyl-N, N-bis (3-hydroxypropyl) aminoethyl phosphonate, dioctyl-N, N-bis (2-hydroxethyl) aminoethyl phosphonate, and dimethyl-N, N-bis (4-hydroxybutyl) aminomethyl phosphonate.

9. The roofing material of claim 1 wherein said condensation is carried out at about 250° F. to about 480° F.

10. The roofing material of claim 1 wherein about 10% to about 35% by weight of alumina trihydrate is distributed throughout said roofing material.

11. The roofing material of claim 4 wherein said hardboard has at least one surface region and at least 1% of alumina trihydrate, based on board weight, is concentrated in each surface region of said hardboard.

* * * * *